US005276542A

United States Patent [19]

Iwayama et al.

[11] Patent Number: 5,276,542

[45] Date of Patent: Jan. 4, 1994

[54] FERROELECTRIC LIQUID CRYSTAL APPARATUS HAVING TEMPERATURE COMPENSATION CONTROL CIRCUIT

[75] Inventors: Mitsuo Iwayama, Odawara; Yoshio Hotta; Akira Tsuboyama, both of Atsugi; Tadashi Mihara, Isehara; Kazunori Katakura, Atsugi, all of Japan

[73] Assignee: Canon Kabushiki Kaisha, Tokyo, Japan

[21] Appl. No.: 868,201

[22] Filed: Apr. 14, 1992

[30] Foreign Application Priority Data

Apr. 15, 1991 [JP] Japan .......... 3-108185

[51] Int. Cl.[5] .......... G02F 1/133; G09G 3/36

[52] U.S. Cl. .......... 359/86; 359/56; 359/100; 359/85; 345/87

[58] Field of Search .......... 359/55, 56, 85, 75, 359/77, 78, 86, 100; 340/713, 784, 805

[56] References Cited

U.S. PATENT DOCUMENTS

| | | | |
|---|---|---|---|
| 4,639,089 | 1/1987 | Okada et al. | 359/56 |
| 4,681,404 | 7/1987 | Okada et al. | 359/56 |
| 4,682,858 | 7/1987 | Kanbe et al. | 359/81 |
| 4,712,873 | 12/1987 | Kanbe et al. | 359/63 |
| 4,712,874 | 12/1987 | Sekimura et al. | 359/68 |
| 4,712,875 | 12/1987 | Tsuboyama et al. | 359/81 |
| 4,712,877 | 12/1987 | Okada et al. | 359/56 |
| 4,714,323 | 12/1987 | Katagiri et al. | 359/56 |
| 4,715,688 | 12/1987 | Harada et al. | 359/86 |
| 4,728,176 | 3/1988 | Tsuboyama et al. | 359/79 |
| 4,738,515 | 4/1988 | Okada et al. | 359/56 |
| 4,740,060 | 4/1988 | Komura et al. | 359/81 |
| 4,765,720 | 8/1988 | Toyono et al. | 359/56 |
| 4,778,259 | 10/1988 | Kitayama et al. | 359/56 |
| 4,796,979 | 1/1989 | Tsuboyama | 359/75 |
| 4,796,980 | 1/1989 | Kaneko et al. | 359/56 |
| 4,859,036 | 8/1989 | Yamanaka et al. | 359/87 |
| 4,902,107 | 2/1990 | Tsuboyama et al. | 359/86 |
| 4,923,285 | 5/1990 | Ogino et al. | 359/86 |
| 4,932,757 | 6/1990 | Hanyu et al. | 359/79 |
| 4,932,758 | 6/1990 | Hanyu et al. | 359/100 |
| 4,952,032 | 8/1990 | Inoue et al. | 359/86 |
| 5,000,545 | 3/1991 | Yoshioka et al. | 359/87 |
| 5,007,716 | 4/1991 | Hanyu et al. | 359/100 |
| 5,033,822 | 7/1991 | Ooki et al. | 359/86 |
| 5,041,821 | 8/1991 | Onitsuka et al. | 359/86 |
| 5,066,945 | 11/1991 | Kanno et al. | 359/56 |
| 5,128,663 | 7/1992 | Coulson | 359/56 |

*Primary Examiner*—William L. Sikes
*Assistant Examiner*—Tai V. Duong
*Attorney, Agent, or Firm*—Fitzpatrick, Cella, Harper & Scinto

[57] ABSTRACT

A ferroelectric liquid crystal device is formed by disposing a ferroelectric chiral smectic liquid crystal between a pair of substrates respectively having thereon one and the other of a group of scanning electrodes and a group of data electrodes disposed so as to form an electrode matrix in combination. A liquid crystal apparatus is constituted so as to detect a temperature of the liquid crystal device and insert a pause period corresponding to the detected temperature in a drive waveform for driving the device.

6 Claims, 9 Drawing Sheets

FERROELECTRIC LIQUID CRYSTAL APPARATUS HAVING TEMPERATURE COMPENSATION CONTROL CIRCUIT

FIELD OF THE INVENTION AND RELATED ART

The present invention relates to a liquid crystal apparatus such as a display apparatus using a chiral smectic liquid crystal which shows ferroelectricity.

Display apparatus using a ferroelectric chiral smectic liquid crystal have been known as disclosed in, e.g., U.S. Pat. Nos. 4,639,089, 4,681,404, 4,682,858, 4,712,873, 4,712,874, 4,712,875, 4,712,877, 4,714,323, 4,718,276, 4,738,515, 4,740,060, 4,765,720, 4,778,259, 4,796,979, 4,796,980, 4,859,036, 4,932,757, 4,932,758, 5,000,545 and 5,007,716.

Such a display apparatus includes a liquid crystal device comprising a cell structure formed by disposing a pair of glass plates each provided with transparent electrodes and an aligning treatment on their inner sides opposite to each other with a cell gap on the order of 1 to 3 μm and a ferroelectric chiral smectic liquid crystal (hereinafter sometimes abbreviated as "FLC") filling the cell gap.

Among such liquid crystal devices, a device containing FLC molecules in an alignment state providing a chevron structure as shown in FIG. 1 has been known to provide an excellent bright state and thus a sufficiently large contrast when combined with crossed nicol polarizers. More specifically, FIG. 1 is a sectional view showing an alignment state of FLC 13 disposed between substrates 11 and 12. The FLC 13 forms a plurality of layers 14 each comprising plural liquid crystal molecules 15. The layers 14 are aligned substantially in a direction and each layer 15 is bent between the substrates. The long axis of each liquid crystal molecule 15 may preferably be inclined to form a pretilt angle $\alpha$ of at least 5 degrees with respect to the substrates 11 and 12. The above-mentioned alignment state may preferably be formed by providing unidirectional alignment axes 16 and 17, which are parallel and in the same direction, to the substrates 11 and 12, e.g., by rubbing.

FIG. 2 (including FIGS. 2A-2C) is a plan view of a device in which FLC 13 assumes a chevron structure as described with reference to FIG. 1. The device in FIG. 2 is constituted by fixing the substrates 11 and 12 having unidirectional rubbing axes 16 and 17, respectively, to each other by means of a sealant 21 to leave a space which is filled with FLC 13. In the device, the substrate 11 is provided with a first group of plural stripe electrodes for voltage application (not shown), and the substrate 12 is provided with a second group of plural stripe electrodes (not shown) intersecting the first group of stripe electrodes, thus forming an electrode matrix. The normal 22 with a vector $n_s$ to the layers 14 of FLC 13 (more exactly the projection of the normal 22 onto the substrates) is substantially parallel to the rubbing directions 16 and 17 as shown in FIG. 2B. The liquid crystal molecules 15 in the device shown in FIG. 2 (FIGS. 2B and 2C) are uniformly oriented leftwards at a tilt angle $+\theta$ with their spontaneous polarization directing from the front face to the back face of the drawing.

According to our experiments, when the FLC in this state was supplied with a voltage (e.g., an AC voltage of $\pm 8$ volts and 10 Hz) applied between the opposite electrodes, a phenomenon was observed that the liquid crystal molecules 15 started to flow rightwards to result in regions 31 with less or lacking liquid crystal molecules 15 on the left side and a region 32 with more liquid crystal molecules 15, when the voltage application was continued for a long period (e.g., 20-50 hours), as shown in FIG. 3 where P denotes the optical axis of a polarizer and A denotes the optical axis of an analyzer arranged in cross nicols. As a result, an interference color was observed over the extension of the device to impair the display quality.

In case where the liquid crystal molecules 15 in FIG. 2B were uniformly oriented rightwards at a tilt angle $-\theta$ with their spontaneous polarization directing from the back face to the front face of the drawing, the liquid crystal molecules 15 were found to move leftwards in contrast to the above.

It was also found that the above phenomenon also depended upon a change in environmental temperature and particularly was promoted when the environmental temperature was elevated.

SUMMARY OF THE INVENTION

An object of the present invention is to provide a liquid crystal apparatus having solved the above-mentioned problem.

According to the present invention, there is provided a liquid crystal apparatus, comprising:

(a) a liquid crystal panel comprising a plurality of scanning electrodes and a plurality of data electrodes intersecting the scanning electrodes so as to form an electrode matrix, and a chiral smectic liquid crystal disposed between the scanning electrodes and the data electrodes, (b) drive means for sequentially selecting a scanning electrode from the scanning electrodes by sequentially applying a scanning selection signal to the scanning electrodes, and applying voltage waveform signals to the data electrodes, each voltage waveform signal including a data signal, a voltage pulse of a polarity opposite to that of the data signal and a pulse of voltage zero, respectively with respect to the voltage level of a non-selected scanning line, in a scanning selection period for the selected scanning electrode, the data signal providing a voltage sufficient to orient the chiral smectic liquid crystal at an intersection of the selected scanning electrode and an associated data electrode to either one or another orientation state depending on the polarity of the voltage in combination with the scanning selection signal, (c) temperature detection means for detecting a temperature of the liquid crystal panel, and (d) control means for controlling the drive means so that the period of the pulse of voltage zero is increased corresponding to an increase in the detected temperature of the liquid crystal panel.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
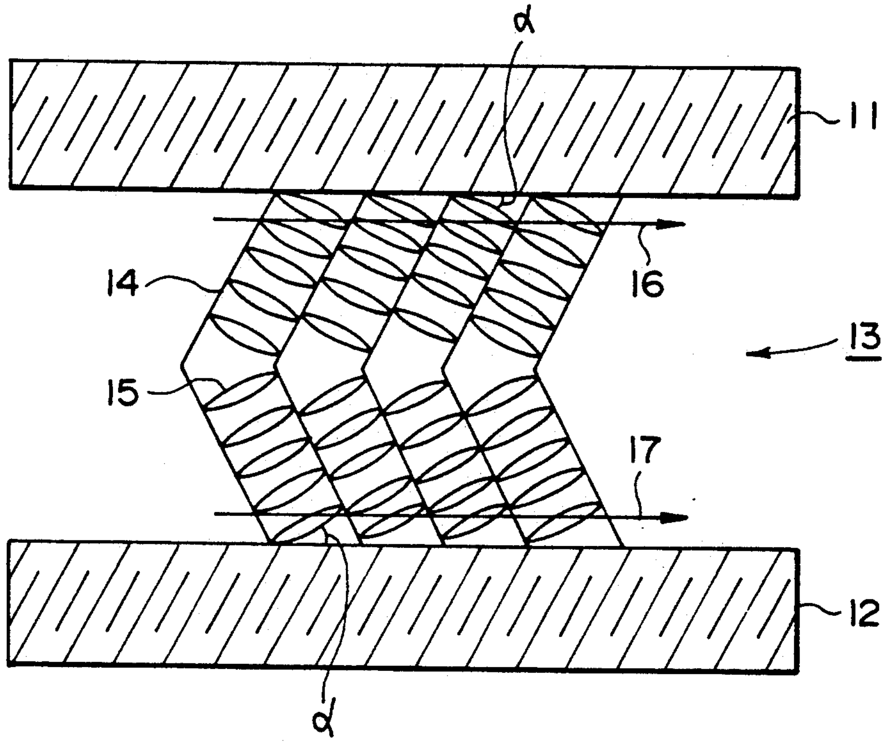
FIG. 1 is a sectional view showing an alignment state of liquid crystal used in the present invention.
Figure 2A:
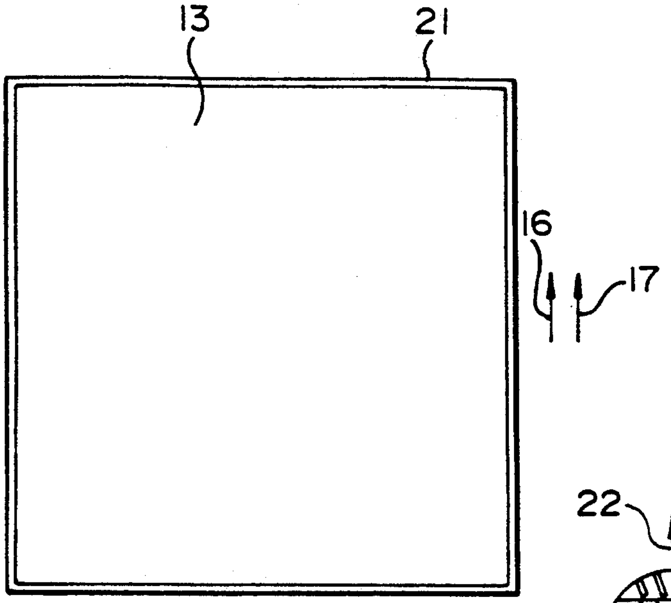
FIG. 2A shows a plan view corresponding to FIG. 1.
Figure 2B:
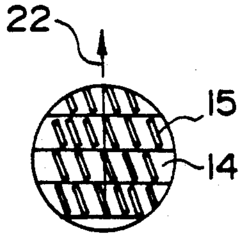
FIG. 2B is a partially enlarged view of FIG. 2A.
Figure 2C:
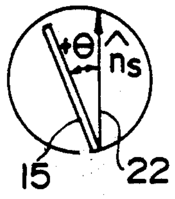
FIG. 2C is a partially enlarged view of FIG. 2B.
Figure 3:
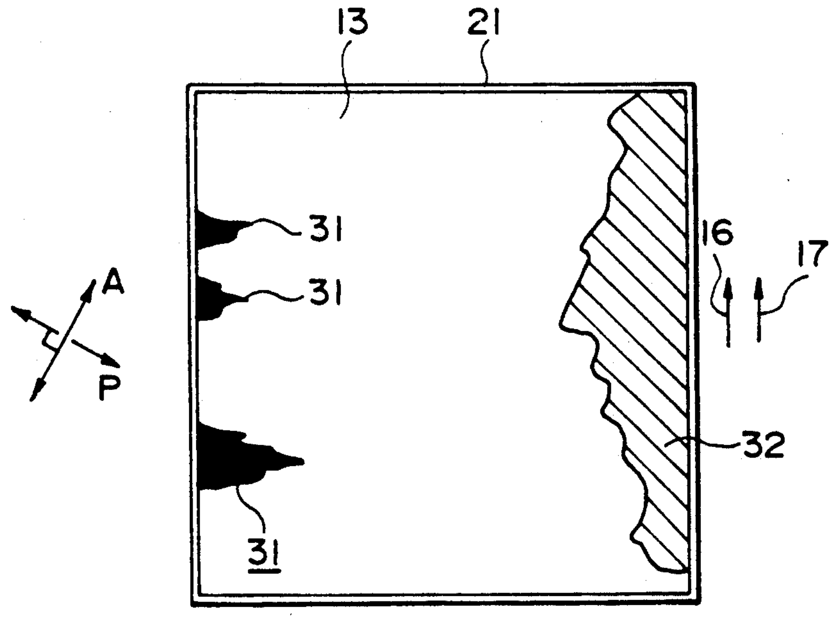
FIG. 3 is a plan view showing an alignment state in a conventional device.
Figure 4:
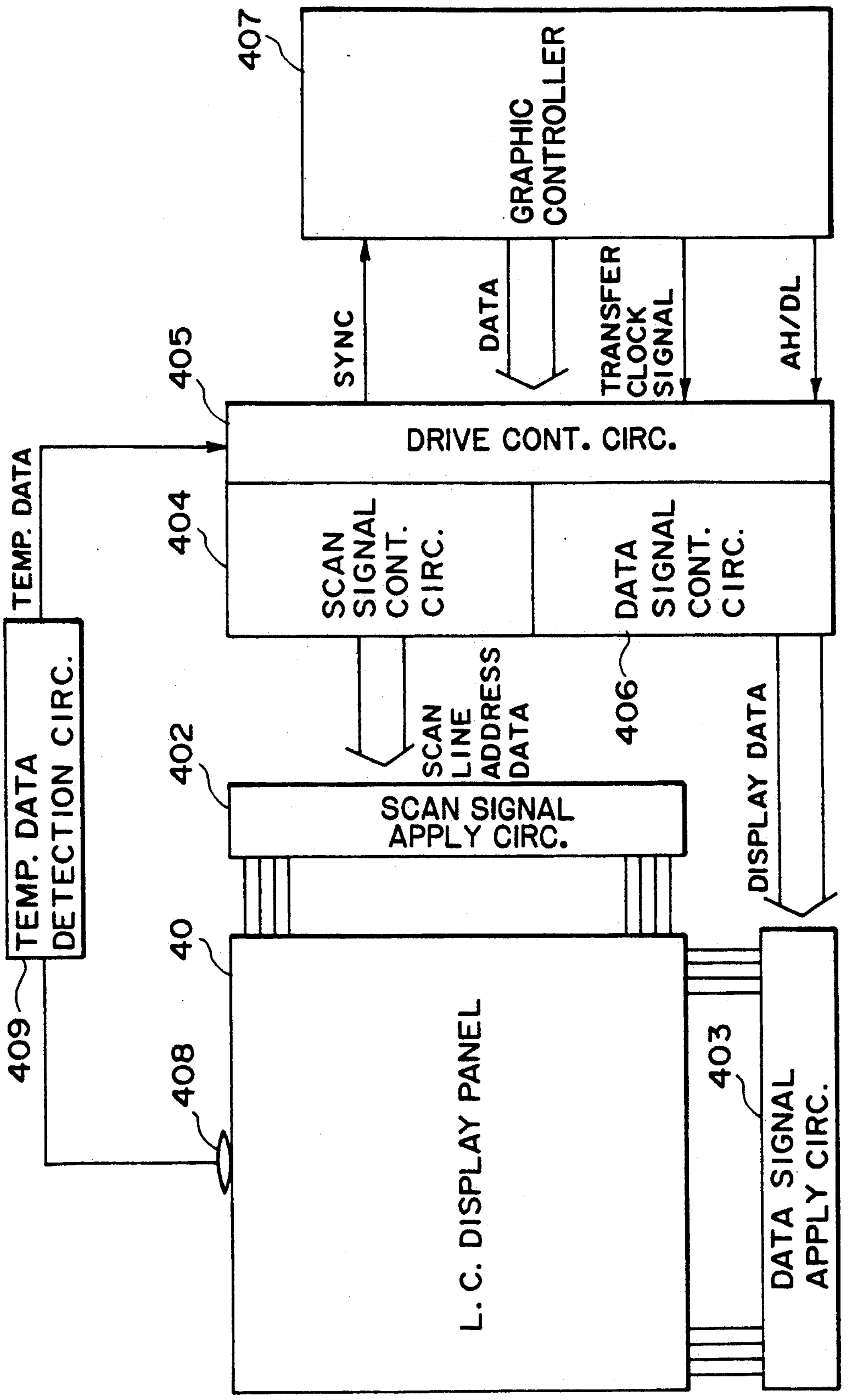
FIG. 4 is a block diagram of a liquid crystal display apparatus according to an embodiment of the present invention.

FIG. 4 is a block diagram of a liquid crystal display apparatus according to an embodiment of the present invention. Referring to FIG. 4, the display apparatus includes a liquid crystal display panel 401, a scanning signal applying circuit 402, a data signal applying circuit 403, a scanning signal control circuit 404, a drive control circuit 405, a data signal control circuit 406, a graphic controller 407, a temperature detection element 408, and a temperature data detection circuit 409. Data sent from the graphic controller 407 are sent via the drive control circuit 405 to the scanning signal control circuit 404 and the data signal control circuit 406 and converted into address data and display data, respectively. On the other hand, the temperature of the liquid crystal display panel is detected by the temperature detection element 408 and the temperature detection circuit 409 from which temperature data are supplied via the drive control circuit 405 to the scanning signal control circuit 404. Based on the address data and display data, a scanning signal is generated by the scanning signal applying circuit 40 and applied to the scanning electrodes in the liquid crystal display panel 401. Further, data signals are generated by the data signal applying circuit 403 based on the display data and applied to the display electrodes in the liquid crystal display panel 401.

Figure 5:
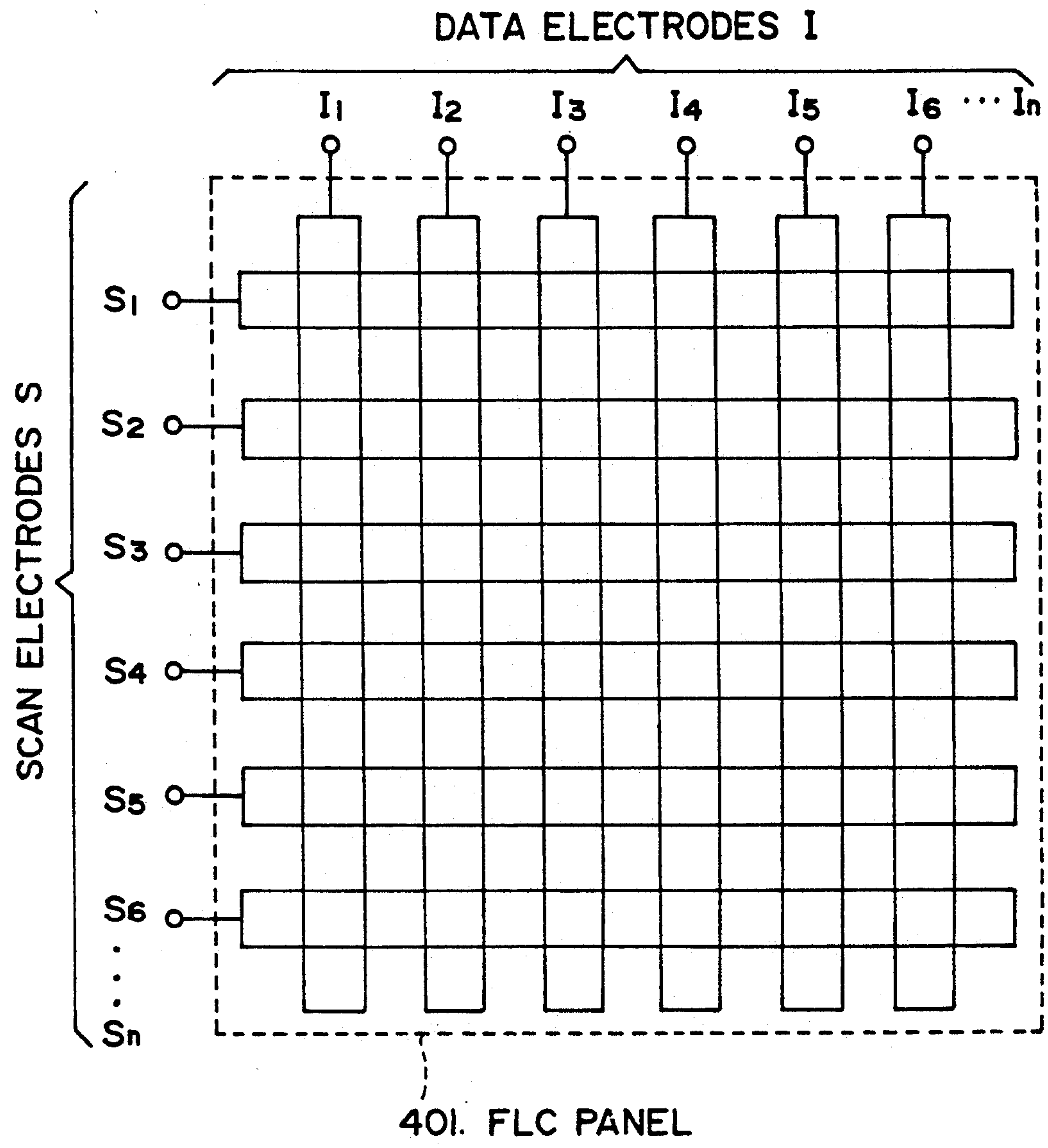
FIG. 5 is an enlarged view of the liquid crystal display panel in the apparatus shown in FIG. 4.
Figure 6:
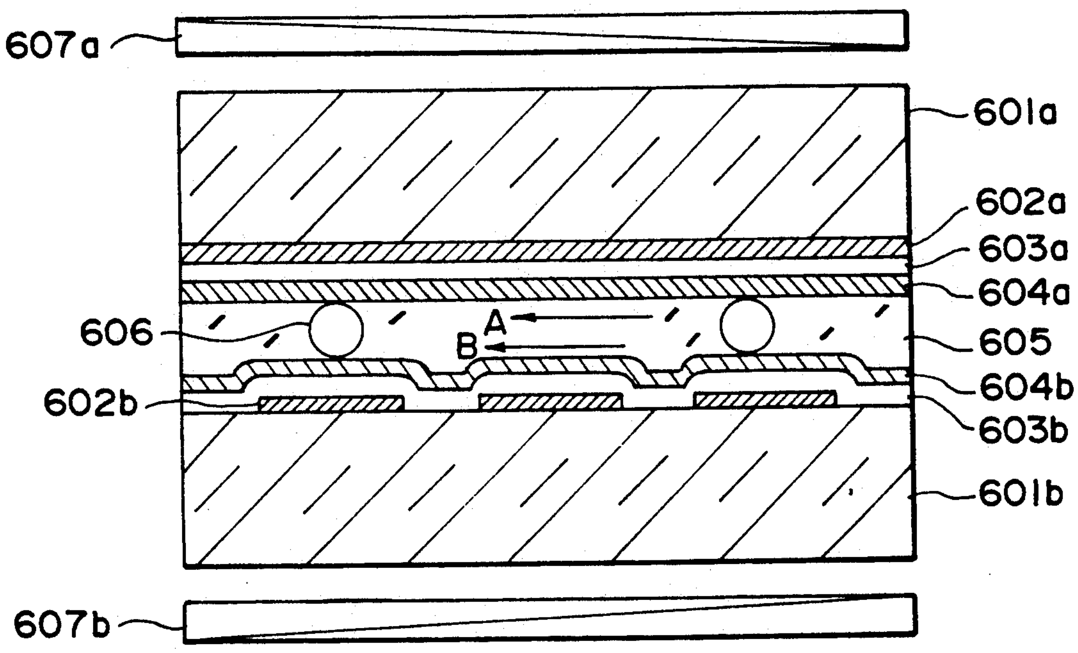
FIG. 6 is an enlarged sectional view of the liquid crystal display panel in the apparatus shown in FIG. 4.
Figure 7:
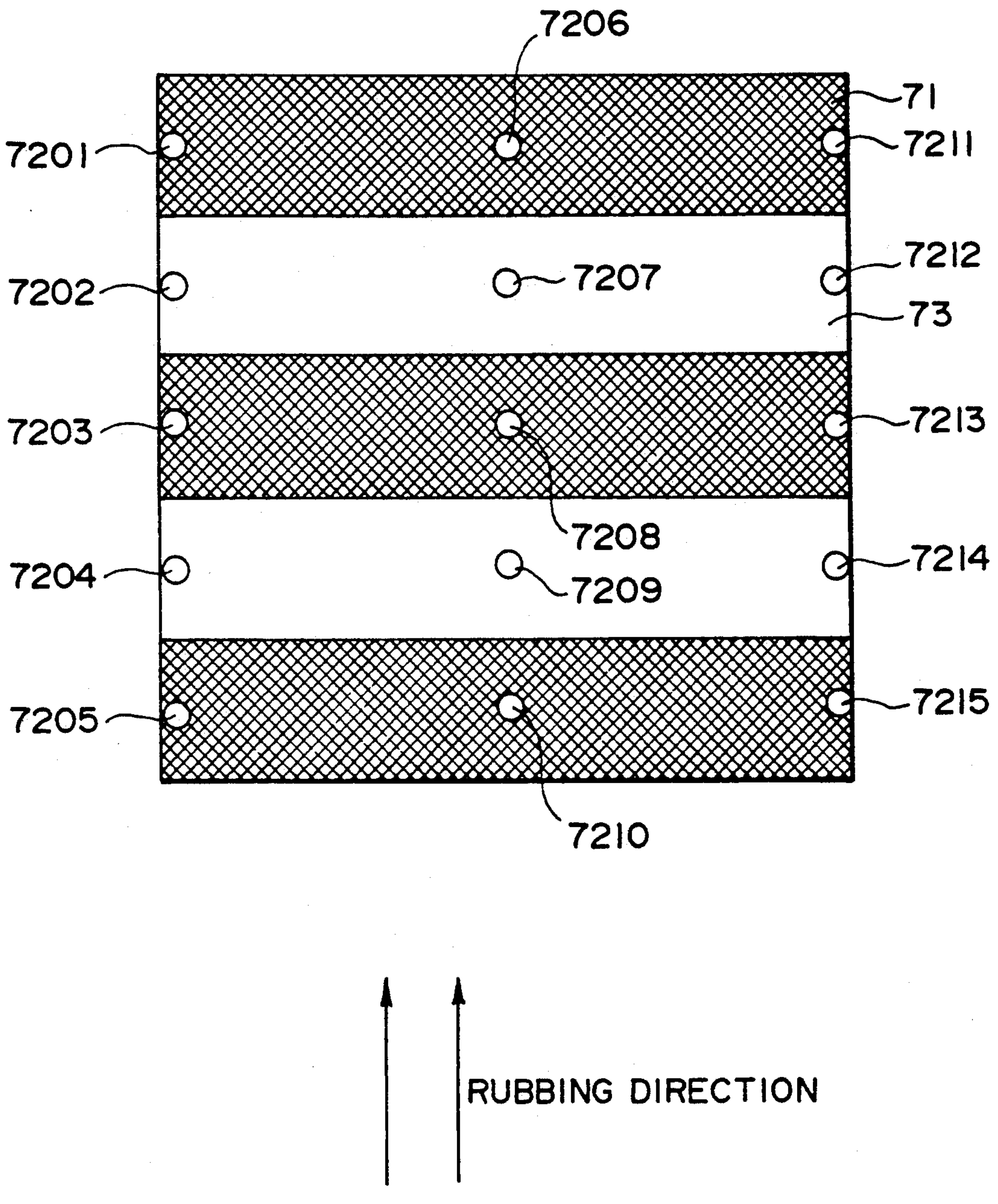
FIG. 7 is an illustration of a display pattern used in an embodiment of the present invention.

FIG. 5 is an enlarged view of the liquid crystal display panel 401 and shows scanning electrodes $S_1$–S6 . . . $S_n$ and data electrodes I1–I6 . . . $I_n$ which are disposed to intersect each other to form an electrode matrix. FIG. 6 is a schematically enlarged view of a section including the scanning electrode $S_2$ in FIG. 5. Referring to FIG. 6, the display panel includes oppositely disposed substrates (glass plates) 601*a* and 601*b* having transparent electrodes 602*a* (constituting scanning electrodes) and 602*b* (constituting data electrodes), respectively, comprising, e.g., $In_2O_3$ or ITO (indium tin oxide) on their opposite faces, which are further laminated with 200 to 1000 Å-thick insulating films 603*a* and 603*b* (of $SiO_2$, $TiO_2$, $Ta_2O_5$, etc.) and 50 to 1000 Å-thick alignment control films 604*a* and 604*b* of, e.g., polyimide. The alignment control films 604*a* and 604*b* are rubbed in the directions denoted by arrows A and B, respectively, which are parallel and identical to each other. A ferroelectric smectic liquid crystal 605 is disposed between the substrates 601*a* and 601*b* which are spaced from each other with a spacing of, e.g., 0.1-3 μm, which is sufficiently small to suppress the formation of a helical structure of the ferroelectric smectic liquid crystal 605 and develop a bistable alignment state of the ferroelectric smectic liquid crystal 605. The sufficiently small spacing is held by spacer beads 606 (of silica, alumina, etc.).

Figure 8:
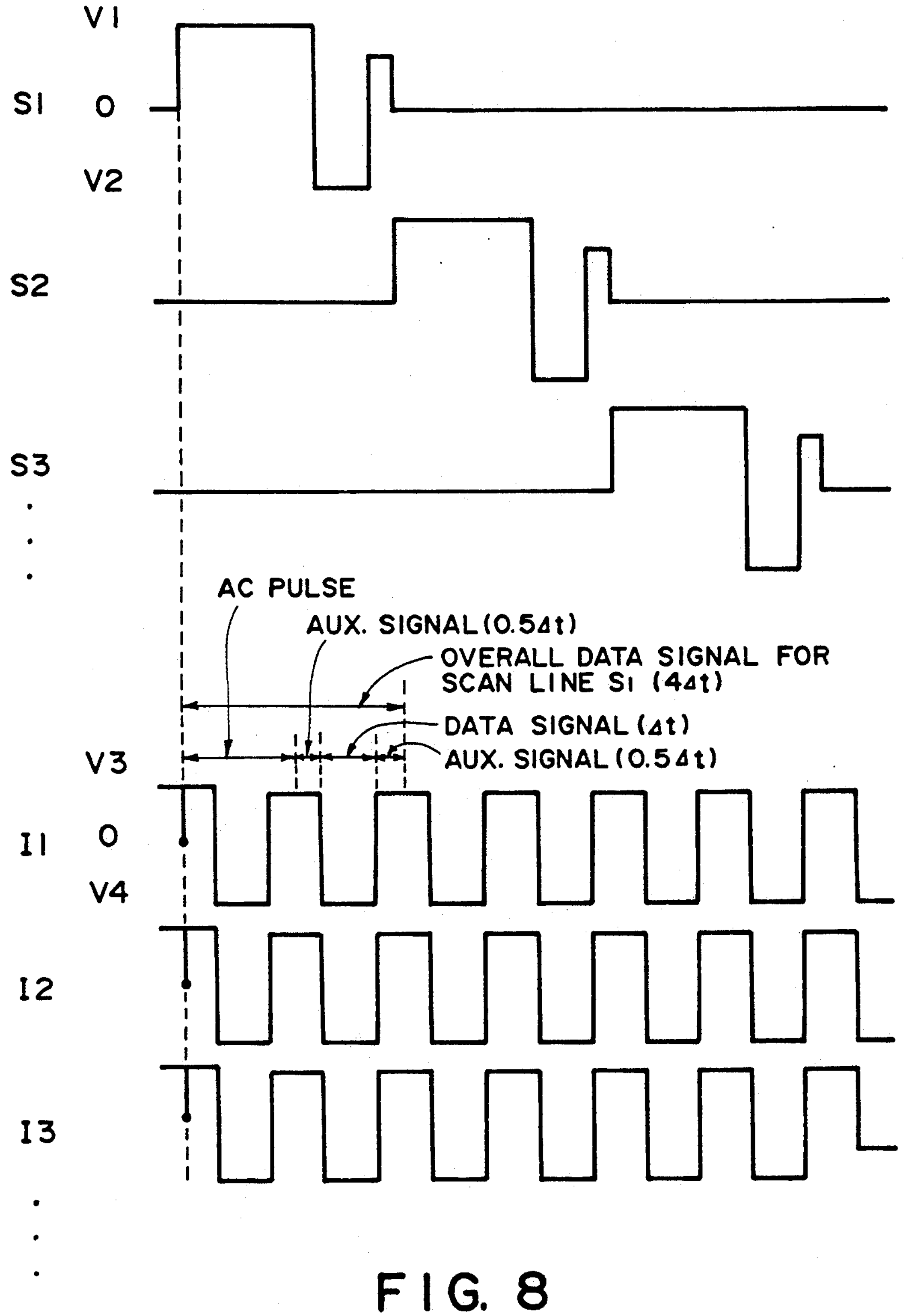
FIG. 8 PRIOR ART
FIG. 8 is a drive waveform diagram conventionally used.

A ferroelectric liquid crystal display panel of the above-described structure was subjected to continuous display of a display pattern including black display stripes 71 and white display stripes 73 for prescribed hours, after which the panel was subjected to measurement or observation of drive margin, cell thickness, color tone and occurrence of liquid crystal-void portions which are items most sensitively reflecting the occurrence of the liquid crystal molecular movement, whereby no change was observed in any of the above-mentioned items, thus showing good results. The cell thickness was measured at points 7201–7215. The set of driving waveform used was one as shown in FIG. 8 including waveforms (scanning selection signals) applied to scanning electrodes $S_1$, $S_2$, $S_3$ . . . and data signal waveforms including no pause period (period of voltage zero) applied to data electrodes I1, I2, I3 . . . and having a voltage amplitude of 15 volts. The surface temperature of the liquid crystal panel at that time was 20° C.

Figure 9:
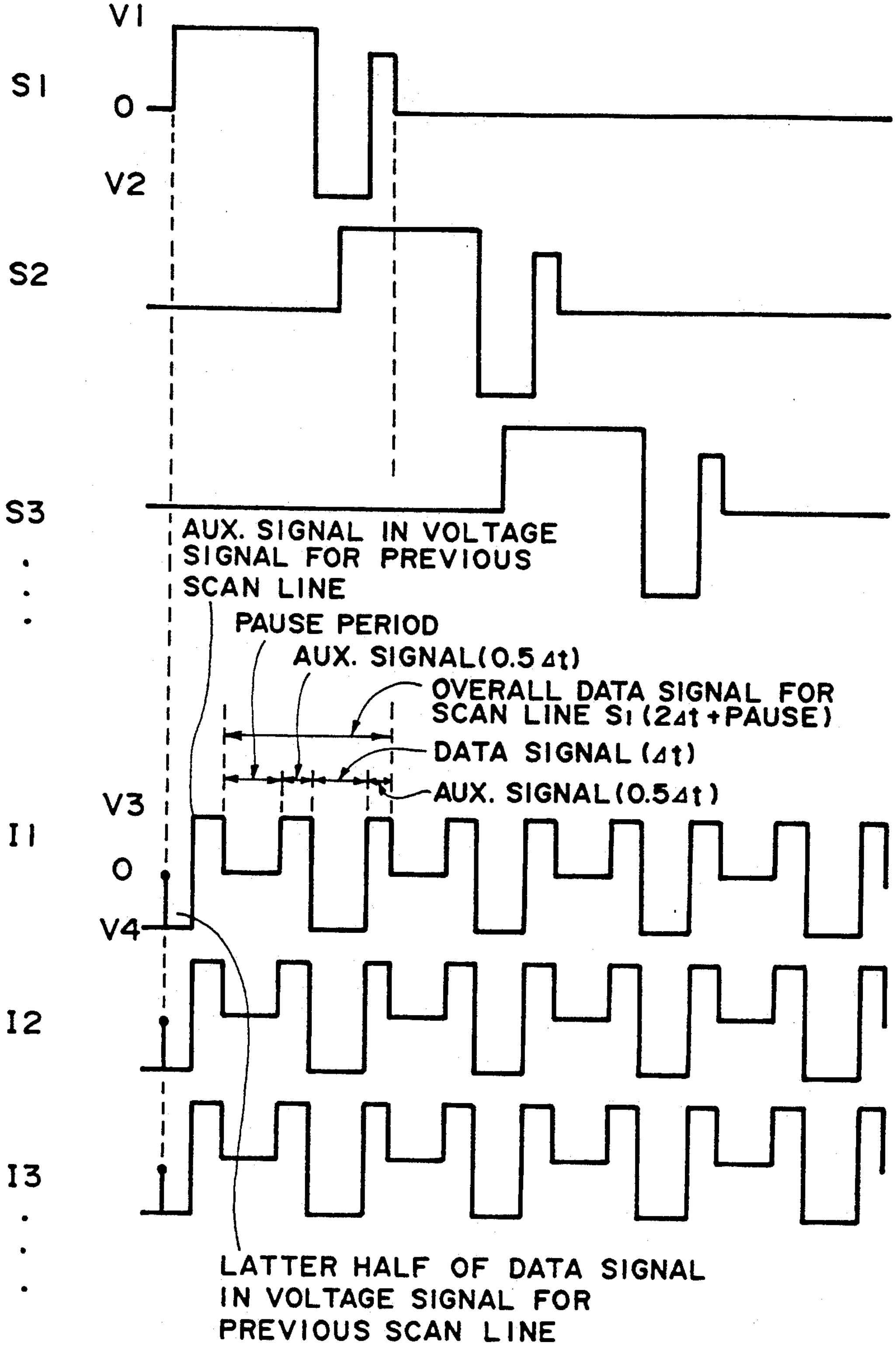
FIG. 9 is a drive waveform diagram used in an embodiment of the present invention.

Good results with no change in any of the above-mentioned items were observed when the panel was driven by using a set of driving waveforms shown in FIG. 9 including a pause period in an overall data signal applied to data electrodes within a period (scanning selection period) for a scanning line of $2\Delta t$ + the pause period under two panel surface temperature conditions of 20° C. and 30° C., respectively.

Figure 10:
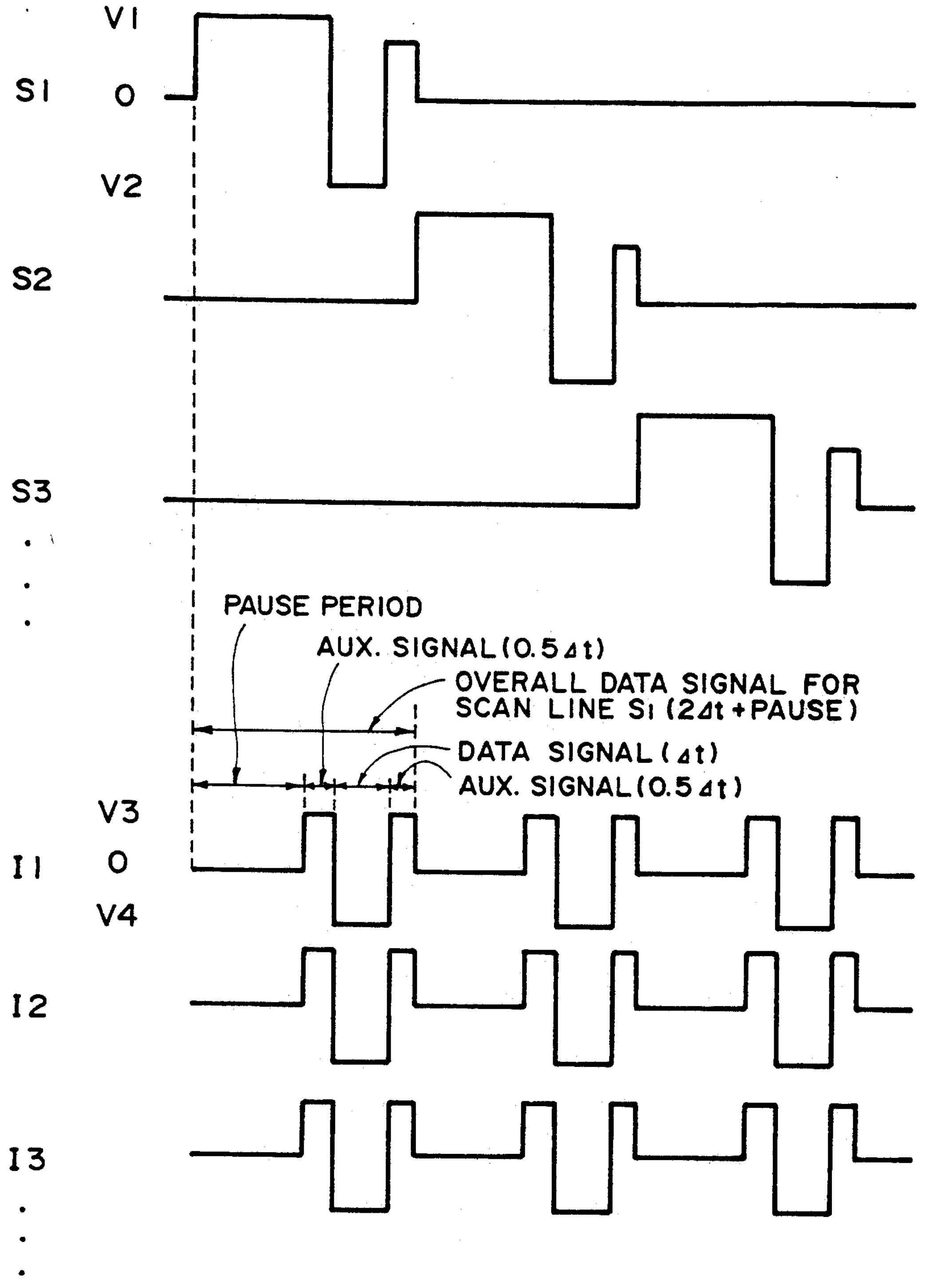
FIG. 10 is a drive waveform diagram used in another embodiment of the present invention.

Further, good results with no change in any of the above-mentioned items were observed when the panel was driven by using a set of driving waveforms shown in FIG. 10 including a pause period in an overall data signal applied to data electrodes within a scanning selection period for a scanning line of $2\Delta t$ + the pause period at three panel surface temperature conditions of 20° C., 30° C. and 40° C., respectively.

In contrast to the above, when the panel was driven continuously by using the set of driving waveforms shown in FIG. 8 at a panel surface temperature of 30° C. and then subjected to similar measurement, whereby the change in color tone or the occurrence of liquid crystal void was not observed but the cell thickness was increased by 2–3% compared with the original value at points 7211, 7213 and 7215 (rightmost points) in black display stripes 71 and at points 7202 and 7204 (leftmost points) in white display stripes 73, thus failing to provide a good results. At these points, an increase in threshold value was observed corresponding to the increase in cell thickness, thus resulting in an adverse effect with respect to the drive margin. Further, when the panel was driven at 40° C. by using the driving waveform shown in FIG. 8, the cell thickness increase was raised to 6–8%, resulting in a corresponding increase in threshold value and a change in color tone.

Further, when the panel was driven continuously at a panel surface temperature of 40° C. by using the driving waveforms shown in FIG. 9 and then subjected to similar measurement, the cell thickness was increased by 1–2% resulting in a corresponding increase in threshold value, but some improvement was attained than in the case of using the driving waveforms shown in FIG. 8.

The above results are summarized in the following Table 1.

TABLE 1

| Driving waveform | Panel surface temp. 20° C. | 30° C. | 40° C. |
|---|---|---|---|
| FIG. 8 | Normal | Cell thickness increased by 2-3%. Threshold value increased. | Cell thickness increased by 6-8%. Threshold value increased. |
| FIG. 9 | Normal | Normal | Cell thickness increased by 1-2%. Threshold value increased. |
| FIG. 10 | Normal | Normal | Normal |

The pulse width Δt of the data signal, pause period and scanning selection period (period of overall data signal for a scanning line) used in the above-mentioned measurement under the temperature conditions of 20° C., 30° C. and 40° C. are summarized in the following Table 2.

TABLE 2

| | (Time in μsec) 20° C. | 30° C. | 40° C. |
|---|---|---|---|
| (1) FIG. 8 waveform | | | |
| Δt | 125 | 100 | 75 |
| Pause period | 0 | 0 | 0 |
| Scan selection period (4Δt) | 500 | 400 | 300 |
| (2) FIG. 9 waveform | | | |
| Δt | 125 | 100 | 75 |
| Pause period | 125 | 175 | 225 |
| Scan selection period (2Δt + pause) | 375 | 375 | 375 |
| (3) FIG. 10 waveform | | | |
| Δt | 125 | 100 | 75 |
| Pause period | 250 | 300 | 350 |
| Scan selection period (2Δt + pause) | 500 | 500 | 500 |

As described hereinabove, according to the present invention, there is provided a liquid crystal apparatus by which an optimum drive waveform is selected depending on a detected liquid crystal panel temperature so that the liquid crystal molecular movement is suppressed to a level practically free of problem.

What is claimed is:

1. A liquid crystal apparatus, comprising:

(a) a liquid crystal panel comprising a plurality of scanning electrodes and a plurality of data electrodes intersecting the scanning electrodes so as to form an electrode matrix, and a chiral smectic liquid crystal disposed between the scanning electrodes and the data electrodes, (b) drive means for sequentially selecting a scanning electrode from the scanning electrodes by sequentially applying a scanning selection signal to the scanning electrodes, and applying voltage waveform signals to the data electrodes, each voltage waveform signal including a data signal, a voltage pulse of a polarity opposite to that of the data signal and a pulse of voltage zero, respectively with respect to a voltage level of a non-selected scanning line, in a scanning selection period for the selected scanning electrode, the data signal in combination with the scanning selection signal providing a voltage sufficient to orient the chiral smectic liquid crystal at an intersection of the selected scanning electrode and an associated data electrode to either one or another orientation state depending on a polarity of the voltage, (c) temperature detection means for detecting a temperature of the liquid crystal panel, and (d) control means for controlling the drive means so that a period of the pulse of voltage zero is increased corresponding to an increase in the detected temperature of the liquid crystal panel.

2. An apparatus according to claim 1, wherein said control means controls the drive means so that a length of the scanning selection period is constant even when the detected temperature of the liquid crystal panel increases.

3. An apparatus according to claim 1, wherein said control means controls the drive means so that a width of the data signal and a width of the voltage pulse of an opposite polarity are shortened corresponding to an increase in the detected temperature of the liquid crystal panel.

4. An apparatus according to claim 1, wherein said chiral smectic liquid crystal is disposed between a pair of substrates respectively having the scanning electrodes and the data electrodes, the substrates being disposed with a spacing therebetween small enough to suppress a helical structure of the chiral smectic liquid crystal, and liquid crystal molecules are tilted with respect to the substrate faces.

5. An apparatus according to claim 4, wherein the liquid crystal molecules are tilted at an angle of at least 5 degrees with respect to the substrate faces.

6. An apparatus according to claim 5, wherein said chiral smectic liquid crystal is in an alignment state forming a chevron structure.

* * * * *